United States Patent
Barrett et al.

(10) Patent No.: US 7,565,367 B2
(45) Date of Patent: Jul. 21, 2009

(54) ENHANCED POPULARITY RANKING

(75) Inventors: Michael E. Barrett, Westborough, MA (US); Alan Levin, Vancouver (CA)

(73) Assignee: IAC Search & Media, Inc., New York, NY (US)

( * ) Notice: Subject to any disclaimer, the term of this patent is extended or adjusted under 35 U.S.C. 154(b) by 345 days.

(21) Appl. No.: 10/047,666

(22) Filed: Jan. 15, 2002

(65) Prior Publication Data

US 2003/0135490 A1    Jul. 17, 2003

(51) Int. Cl.
    G06F 17/00    (2006.01)
(52) U.S. Cl. .................... 707/102; 707/100; 707/101
(58) Field of Classification Search .................. 707/3, 707/4, 5, 10, 100–102
    See application file for complete search history.

(56) References Cited

U.S. PATENT DOCUMENTS

| | | | |
|---|---|---|---|
| 5,278,980 A | 1/1994 | Pedersen et al. | |
| 5,321,833 A | 6/1994 | Chang et al. | |
| 5,535,382 A | 7/1996 | Ogawa | |
| 5,742,816 A * | 4/1998 | Barr et al. | 707/10 |
| 5,754,939 A | 5/1998 | Herz et al. | |
| 5,835,087 A | 11/1998 | Herz et al. | |
| 5,907,836 A | 5/1999 | Sumita | |
| 5,974,412 A | 10/1999 | Hazlehurst | |
| 6,006,222 A | 12/1999 | Culliss | |
| 6,014,665 A | 1/2000 | Culliss | |
| 6,067,539 A | 5/2000 | Cohen | |
| 6,078,916 A | 6/2000 | Culliss | |
| 6,182,068 B1 | 1/2001 | Culliss | |
| 6,269,368 B1 | 7/2001 | Diamond | |
| 6,385,602 B1 * | 5/2002 | Tso et al. | 707/3 |
| 6,434,556 B1 * | 8/2002 | Levin et al. | 707/3 |
| 6,546,388 B1 * | 4/2003 | Edlund et al. | 707/5 |
| 6,681,247 B1 * | 1/2004 | Payton | 707/10 |
| 2002/0029186 A1 * | 3/2002 | Roth et al. | 705/37 |
| 2003/0023712 A1 * | 1/2003 | Zhao et al. | 709/223 |
| 2003/0195877 A1 * | 10/2003 | Ford et al. | 707/3 |
| 2006/0004594 A1 * | 1/2006 | Doliov | 705/1 |

OTHER PUBLICATIONS

Savoy, J., "A new problalistic scheme for information retrieval in hypertext" New review of Hypermedia and Multimedia, vol. 1, pp. 107-134, 1995.
Fuhr, N. "Probalistic learnign approaches for indexing and retrieval with TREC-2 collection." Sep. 1993.
Kimoto et al. "A Dynamic Thesaurus and Its Application to Associated Information Retrieval" IJCNN-91-Seattle, vol. 1, pp. 19-20, Jul. 1991.
Bidmead, C. "Windows Personal Librarian" Which Computer?, vol. 16, No. 10, pp. 23, Oct. 1993.

* cited by examiner

*Primary Examiner*—Sana Al-Hashemi
(74) *Attorney, Agent, or Firm*—Stephen M. De Klerk; Sonnenschein, Nath & Rosenthal LLP

(57) ABSTRACT

A method of organizing information in which the search activities of previous users is monitored and such activity is used to organize information for future users. The user activities are monitored from a time and use based perspective to insure more relevant results can be provided in response to a user's search for information.

16 Claims, 2 Drawing Sheets

Figure 2

| Query | Information A | | Information B | | Information C | | Information D | |
|---|---|---|---|---|---|---|---|---|
| | OS | EPS | OS | EPS | OS | EPS | OS | EPS |
| Q1 | 10 | 8 | 8 | 10 | 6 | $OS_{rem}$ | 4 | $OS_{rem}$ |
| Q2 | 8 | $OS_{rem}$ | 1 | $OS_{rem0}$ | 2 | $OS_{rem}$ | 11 | $OS_{rem}$ |
| Q3 | 4 | 9 | 6 | 15 | 8 | $OS_{rem}$ | 10 | $OS_{rem}$ |
| Q4 | 10 | 21 | 8 | 20 | 6 | 0 | 4 | 4 |

ENHANCED POPULARITY RANKING

BACKGROUND OF INVENTION

The field of the invention relates to providing relevant results in response to queries issued against large collections of information such as exist in large databases or on the Internet. The Internet is an extensive network of computer systems containing hundreds of millions of documents, files, data bases, text collections, audio clips, video clips and samples of any other type of information. Additionally, many companies have, and are growing, vast databases of information against which both internal and external queries are permitted, for instance, news archives. As used throughout, the term "information" will refer to data on a web page, the web page itself, attachments to a web page, data contained in a database or other storage device. Research engines and search techniques are available to users for use in locating information that they need. One search result ranking technique, identified as popularity ranking, is demonstrated in the patent entitled "Personalized Search Methods," U.S. Pat. No. 6,182,068, which is incorporated by reference herein. A further description of the popularity ranking, is demonstrated in the patent entitled "Personalized Search Methods," U.S. Pat. No. 6,006,222, which is also incorporated by reference herein. There are many other techniques utilized in an effort to reduce vast amounts of information down to a manageable amount, which fit the needs of users generally, or even a particular user. However, as more and more information gets added to databases or is made available over the Internet, continued efforts to refine and filter the information to satisfy the needs of users will be necessary.

Traditional techniques for ranking relevancy can become skewed over time. An example of this is use of the popularity technique of assigning relevancy, based on the absolute number of uses ("clicks") the information has received. In the situation where the particular query of the "United States President" is entered, sites referring to Bill Clinton may have received numerous uses (hits) during his tenure as President, but the user in 2001 entering that query may be anticipating results for George W. Bush. Similarly, studies have shown that results that are ranked near the top of a result list generally receive more use than results further down on the list. Therefore, if relevancy ranking of results is based on number of uses, the ranking becomes somewhat self-fulfilling and the top results may never be displaced. Therefore, a technique that takes into account the age of uses, as well as other factors that would have led to higher or lower usage, is needed to refine relevant search results for users seeking information.

SUMMARY OF INVENTION

It is an object of the invention to organize information provided in response to queries into any collection of information, utilizing time and use-based techniques. It is an additional object of the invention to organize information, in response to searches against any collection of information, based on reasonable expectations of how many uses the information will generate. The present invention may be utilized as the primary relevancy determining mechanism for search results or can be used as an enhancement to any existing relevancy defining technique.

The present invention utilizes the activity of previous users (searchers) in response to particular queries to increase relevancy responses. The activity of a user can include selecting (clicking on) particular information provided in a results listing. In the present invention, one technique to increase the relevancy of results provided to the user is to take into account the timing of prior users" selections or use of particular information.

Another aspect of the present invention takes into account where in a prior results listing a particular piece of information was ranked when prior users selected it. The present invention can also utilize the expected use rate, or frequency, of particular information and adjust results ranking, based on the use rate, or frequency, that the information actually receives versus the anticipated. It is a further object of the present invention to take into account the fact that some information is used more frequently than other information and to adjust the relevancy ranking for particular information based on whether its use rate by previous users when the information was provided in query results were higher or lower than the information's general use compared to other information.

Search results can be enhanced by utilizing any of the elements of the present invention alone, or combining any or all of the various components and their extensions to increase the relevancy returns. Additionally, each of these steps or combinations thereof may be used on their own to assign the entirety of the relevancy ranking or utilized in conjunction with other relevancy techniques such as those disclosed in U.S. Pat. Nos. 6,182,068 and 6,006,222.

BRIEF DESCRIPTION OF DRAWINGS

FIG. 2 is a diagram of a database of the present invention.

DETAILED DESCRIPTION

Figure 1:
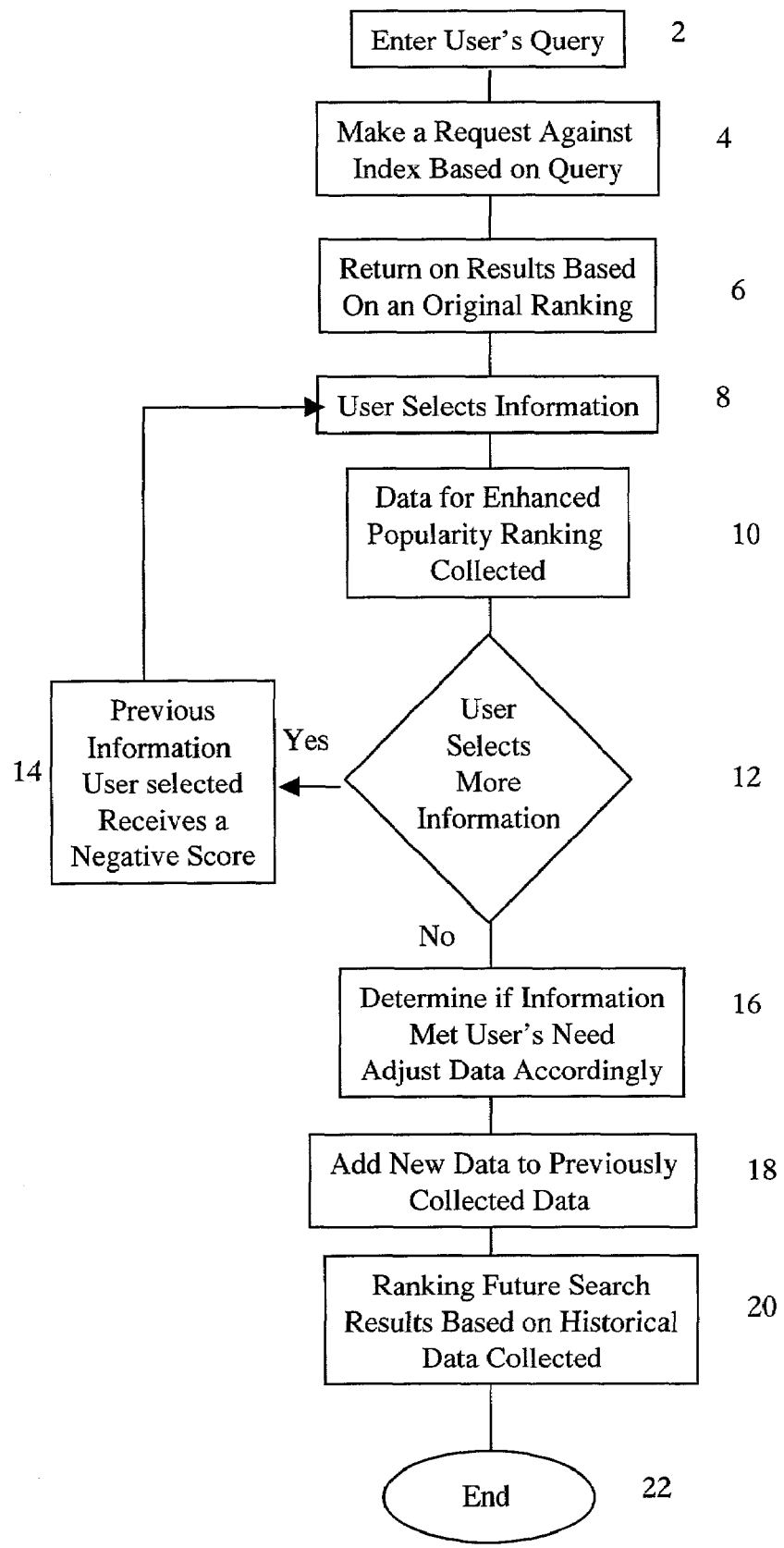
FIG. 1 is a flow chart depicting the method of the present invention.

There are a growing number of vast collections of information, the most prominent of which is the Internet itself. As the amount of information in any given collection of information grows the importance of narrowing relevant search results that are provided to a user in response to a query grows. The present invention starts with an indexed set of information. The index could be created by using any previously known relevancy techniques, keyword indexing, random selection, date of creation of the data, and or any other technique for indexing of data. Once users begin interacting with information as it appears in search results based on the index, data concerning that interaction will be collected pursuant to this invention. The collected data will be used to generate the enhanced popularity rankings of the present invention. The information in the index will then begin to be assigned enhanced popularity rankings, which can be used separately for ranking purposes or combined with other ranking factors.

FIG. 1 depicts a flowchart of the present invention. In Step 2, a user enters a query into a search engine that will search a collection of information. In Step 4, a request is made against an existing index of the collection of information based on the user query. In Step 6, search results indicative of information are returned to the user based on ranking associated with the index. In the preferred embodiment, before the enhanced popularity scores of the present invention have been created, a set of original rankings will be used. Those original rankings may be based on popularity rankings, editor selection, or any other indexing/relevancy ranking method, including traditional keyword information retrieval.

In Step 8, the user will review the search results and select information the user believes will satisfy their needs. For Internet search results, the act of selecting the information will be clicking on the link that takes the user to the website.

In Step 10, the present invention collects data regarding the user's selection and use of the information. The present invention can collect all of the following, or a subset thereof, depending on the factors the designer intends to use in Step 14 below: what information was selected, what was it ranked when it was selected, what is the historical use rate of the information selected, what summary of the selected information was shown to the user, was there a pre-defined expectation of use for the information, time of day and date of selection and personalized data about the user (what zip code are they in, do they have preferences, are they male/female, are they in a particular profession, and historical data about their previous selections).

In Step 12, the system determines if the user selects more information from the same list of results. If the user does select more information from the same set of results, in Step 14 the information that was previously selected is given a negative score since it did not satisfy the user's need. In a further embodiment, the system will also track the summary of information that was shown to the user, and the query the user entered, to indicate that while the summary caused the user to select information, the information did not satisfy the user's needs. This may imply that the summary did not accurately reflect the information. If the user does not select more information, in Step 16, the system of the preferred embodiment determines if the information met the user's needs. In Step 16 the system can track the time the user spent with the information versus the time that historical, empirical, or estimated data indicates would have been spent with information satisfying the user's need. If the information satisfied the user's need, all data collected in Step 10 above is valid, if the information is not determined to have satisfied the user's need, the data collected in Step 10 above is invalidated and the information is given a negative score as not having satisfied the user's need. At this point, any information that was not viewed is given a slightly negative score so as to reflect the fact that it was shown but not selected. In Step 18, the present invention will add the newly collected data to historical data from other uses. In Step 20, the present invention will rank future search results based on enhanced popularity scoring generated from some or all of the data collected in Steps 10, 12, 14 and 16. At this point the process ends 22.

The process of ranking future search results based on the enhanced popularity scoring of the present invention can include many potential refinements to create better relevancy ranking for the user. The basic technique of the present invention is to utilize the time history of uses of information, collected in Step 10, and create an inflationary ranking. For the inflationary ranking, newer uses will be valued more than older uses. In other words, the present invention uses a basic use ranking but enhances it by considering the actual timing of previous uses. The higher the defined inflation rate, the faster older uses cease to influence the popularity ranking. Another term for the inflation rate is time decay. The present invention's enhancement of popularity for time decay can be applied in many different ways. For instance, a prior use on the same day as when the query of Step 2 is entered may receive 100% value whereas the value for each previous day is reduced by 1% until a use 101 days ago is no longer factored into the enhanced popularity ranking. Another technique of the present invention is to use less granularity so that any uses in the last 30 days receive full value, uses between 30 days and 12 months receive some partial value, and on down to whatever the designer may decide. In a system where all uses throughout time are designed to have an influence, the decay rate will never take the resulting influence of any use to zero.

As a matter of granularity, the particular decay rate and structure may be defined by the designer based on query type or other personalized factors. For instance, if a query relates to history, one may not wish to ever ignore a use no matter how old. If a query relates to stock prices or financial news, the designer may choose to use an accelerated decay rate. If personalized data is available and it is known for instance that the person entering the query enjoys history, the present invention may apply the decay rate reflective of the particular user's tendency to view historical information. Whether a particular time decay rate is performing as it should will be measured by determining if the returned results appear to be better ranked on the basis of relevancy, i.e. the results users wanted are rising to the top. Another technique for time decay may be to create a cumulative time decay ranking and adjust that overall ranking based on any new clicks without tracking individual uses over the course of any time period.

Once the present invention is being used to provide a popularity ranking based on timing of previous uses, adding additional sites into the index, can be permitted by simply letting them be ranked on the same basis, or by using a normalizing factor in Step 20 to account for the difference in length of time the information has been in the index. Use of a normalizing factor of the present invention can take a number of forms. One of which is creating an assumed historical enhanced popularity score based on where the new information appears in the index. For instance, if the average web site on dog obedience in the index has a historical time based hit rate of one hit per day, the same could be assumed for a new site on dog obedience. The assumed score could be subjective in that an operator could review the information against other similarly indexed information and could create an assumed historical use trend for the new information. Another approach could be to look at actual trends for other new information in similar indexed categories and use the actual trends from those new entries to assume a historical use trends for the current new entry.

In one preferred embodiment of the invention, the ranking of Step 20 is changed based on the various sites traffic or information's use, by modifying the decay rate dynamically based on the traffic. This is called the adaptive inflation approach. The adaptive inflation approach is useful to adjust for spikes in traffic that may occur as a result of one-time events, trending up or down of uses of information, or cyclical use of information. For instance, if a site such as Napster.com becomes the focus of a highly publicized lawsuit, the traffic to the site may spike unusually after the news reports. With the dynamic approach of adaptive inflation, the unusual high use would be recognized and the decay rate would be modified instantly to create a better enhanced popularity score. As the traffic slows again, the inflation rate will be dynamically recalculated to reflect the lower traffic. For instance, the decay rate of highly used information may ignore uses that occurred more than four days before the current search, where the decay rate for information used less often may account for all previous uses. In the adaptive inflation approach, as the traffic increases to a site, the decay rate used for the site will be temporarily decreased to accelerate the rate the enhanced popularity score will increase. Over time, the decay rate will then be increased to reflect the actual site traffic. When the traffic to a site, or the use of the information, returns to normal, the decay rate will also return to normal.

A statistical approach can be used to smooth the use curve to attempt to smooth the impact of the unusual spike in usage. Traditional digital filtering techniques can be employed to help smooth the input data as a preprocessor. Both FIR (finite impulse response) and IIR (infinite impulse response) techniques are applicable. For the present invention a low pass IIR to give a desired smoothing is easier to apply. The IIR approach does have a "memory" due to its recursive nature. Additionally, noise terms can be used to raise the inflation rate, this punishing the result for the erratic behavior. The standard deviation or variance of the data is one such standard statistical metric. A higher value indicates a noisier more random distribution of clicks.

The preferred formula for the enhanced popularity score of the present invention when using the adaptive inflation approach, is as follows:

$$\text{Enhanced Popularity Score} = \sum h_I * \frac{\sum\limits_{pop} h_B}{\sum\limits_{pop} h_x}$$

The rank adjusted score for a site is:

$:h_B = h * f(\text{rank})$ h=1 hit or click
f(rank)=statistically derived distribution where f(1)=1 and increases for lower rank results
The time inflated score is:

$h_I = C_h * (h_B * f(m))$ m=time in days from beginning of tracking on this query-URL the statistics coefficient, $C_h$ is a:

$$C_h = 1 - 0.5 * (1 - e^{m/10}) * \left[ \frac{\sum h_B^2}{(\sum h_B^2)} - \frac{\sum h_B}{m} \right]$$

and the performance factor is calculated as:

$h_x = \text{shown} * f(\text{rank})$

Shown=number of times a result was shown on a results page
For the adaptive inflation approach, the formulas preferred formulas are as follows:

Sum for i=0 to N in a day adjustedclicks=adjustedClicks+f(rank[i])*f(timeUserSpent[i])

rateProduct=rateProduct*rate popScore=popScore+rateProduct*adjustedClicks rate=rateFloor+

1)+ScoreRateDelta*Score/ScoreDenom
2)−HitRateDelta*DeltaHits/(Hits+HIT0)
3)+NoiseRateDelta*ABS(DeltaHits)/(Hits+HIT0)
4)−SquareRateDelta*ABS(DeltaHits)*DeltaHits/(Hits+HIT0)^2

Where the above factors are designed to:
1) Ensure higher scores decay faster
2) Boost for ramp up in traffic, penalty for ramp down+4) Drive down noisy data As the above equations point out, the preferred embodiment is to create an enhanced popularity score, which uses inflationary values to normalize previous uses of a result to a score at the present time of the new search being ranked. As such, the decay rate is really defining the inflation factor to adjust previous clicks into a score today of value overall. This is most evident in the adaptive inflation equation above, where the rate Floor could be 1.07 inflation factor and the additional factors enhance or reduce that inflation factor.

While the adaptive inflation approach, when applied properly will be more responsive, and therefore more accurate, it may be significantly difficult to implement. An additional preferred embodiment of the present invention called the blended inflation approach is simpler to implement, but may surrender the absolute accuracy of the adaptive inflation approach. The blended inflation approach tracks a site as both a highly trafficked site and sparsely visited site. As such, two different decay rates are used, one a lower rate for lower trafficked sites and the other a higher rate for higher trafficked sites. The present invention maintains two different hypothetical enhanced popularity scores for each key term for each site, each hypothetical score using one of the decay rates. An enhanced popularity score can be created by taking a percentage of each hypothetical score that was based on each of the different decay rates, using a weighting factor based on actual traffic. If the traffic to the site is equal to the lower hypothetical traffic, the enhanced popularity score can be skewed to only consider that hypothetical enhanced popularity score. If the traffic to a site increases, the enhanced popularity score can include some blend of the two hypothetical scores. All the same factors that lower and raise the decay rate for adaptive inflation can be applied to influence the mix for blended inflation. Therefore, the blended inflation approach combines the hypothetical scores, based on actual traffic patterns, to create the enhanced popularity score. This allows a smooth continuum of effective decay rates as a site goes through the various cycles of being more or less trafficked. This blended approach ensures that the correct decay rate is eventually applied to the site, however, it will not generally be as responsive, and therefore not as accurate at any given moment. Adaptive inflation, actually dithers the decay rate, rather than mixing the result of a high and low rate to achieve accuracy at all times.

Further embodiments of the adaptive or blended inflation approaches are to consider historical traffic numbers. For instance, on the Internet, the espn.com site may receive far more traffic than a regional sports site. For the time-based enhanced popularity ranking, the present invention contemplates that the decay rate could be adjusted to decay faster for information that is, historically, used more frequently. In other words, the fact that the results showing espn.com has not been selected in the last three days of search results is more significant than the fact that the regional sports site has not been selected in the same three days. The present invention can also take into account traffic of a site from different regions. For instance, on a national basis, espn.com may receive much higher traffic than the regional sports site. However, if the present invention were used to track use from a certain region, that region's own sports site may be the most highly trafficked by that segment of the public. The present invention, in Step 20, can compensate to adjust the enhanced popularity ranking by region so as to further improve the results presented to a user in that region. If less accuracy and more convenience is necessary, the traffic factor assessment could be modified only once a year, once a quarter, or at any reasonable time period, either using formulas based on actual traffic, or other information such as Nielson Net Ratings. As would be clear, this will not provide real time accuracy, but for reasonably steady traffic subjects, this may be sufficient.

Another important aspect of the ranking of Step 20 of the present invention, which can be utilized with either the adaptive inflation or blended inflation approaches, allows for ranking responses to information against a subjectively, or formulaically, created expected usage profile. This is called the performance approach. Basically, this approach would create a modified enhanced popularity score as follows: Modified Score=Enhanced Popularity score*(hits/expected hits). Therefore, if hits are higher than expected, the modified score is higher, and vice versa for lower than expected hits. The expected hits can be estimated simply as a function of ranking in results and how many times a result has been shown. Alternate methods involve implying how many times a result has been "seen." A result has not been judged to have been "seen" unless the user has selected a result deeper in the list.

This works best when the queries and results follow a rather smooth pattern of relevancy. However, in situation where the distribution of hits will not reliably follow ranking, the expected hits can be computed by query or by query family (a logical grouping of queries). This will help address situations when there is really only one right answer, for instance when the user is really looking for Ford's website. Therefore, as information is gained from queries compared to user's clicks, more accurate expected use per queries can be created. An additional or alternative approach is to increase the feedback gain as shown in the equations above. As with the blended approach, if the expected hits is set based on all queries, the feedback factor can be set a little lower to average out for the one right answer scenarios. Therefore, overall the results are generally closer, but in any given instance, may not be as accurate as a query-by-query approach.

This performance factor is important for two reasons. Firstly, it can help the scoring system to be more responsive. Poor performers will be driven off the list more rapidly with the application of this factor. Conversely, new entries to the list will be boosted to their rightful rank more quickly while they accumulate score and settle to their rightful rank. This segues into the second benefit of the performance factor. It can settle potential instabilities in relative rankings between two or more URLs more rapidly.

Both the blended and adaptive inflation algorithms accurately model many of the factors that are needed for timely relevant rankings by the popularity method. However, the approximations made when developing the coefficients for boosting for low rank and decaying old clicks will not be exact for every query-URL association. The boost for rank is attempting to account for only the portion of clicks missed by a URL because the selection is low on the list and not the portion that are missed because it may be less relevant. There may be small errors that will result in results climbing to rapidly because their clicks while at lower ranking are being valued too highly, thus driving them to be at a higher position then deserved. Eventually the URLs below will accumulate more rank adjusted clicks and move above. The now demoted URL will now receive clicks with higher weight. This may move the URL up above the others again. The performance factor will make these movements happen faster and will help stabilize the final rankings.

In further embodiments of both the adaptive inflation approach and the blended inflation approach, the analysis of use can include all uses, or can be adjusted for subsets. For instance, time of day may influence what web sites receive more uses. Therefore, the enhanced popularity ranking of the present invention could be selected based on scores that relate to a particular time of day. During the day, searches that are performed may be more work oriented, where searching in the evening may be more personal in nature. As such, the same query may have a different use profile during work hours than it does during evening hours. The present invention could be personalized, or grouped by user type, i.e. 18-24 female. The enhanced popularity ranking could be limited to scores drawn only from uses by users from a certain region.

Of course the enhanced popularity scores of the present invention can be blended or weighted differently to reflect the actual results seen at any given search site. As described above, while using any approach of the present invention, other approaches could be tracked and calculated and substituted if the results of a different approach seem to be more accurately predicting the needs of users.

Now that creation of enhanced popularity scores has been discussed the next section will discuss how the enhanced popularity scores can be utilized in operation to begin to impact the ranking of results provided to users. In a preferred embodiment of the present invention, the different embodiments, or combinations thereof, are used in conjunction with the popularity techniques described in U.S. Pat. Nos. 6,006,222 and 6,182,068. In the preferred embodiment, the present invention is used to increase the relevancy of search results provided to users from web searches. Prior to application of the present invention, existing web pages are preferably indexed using the popularity technique of tracking actual number of clicks on a site from search results, and ranking results accordingly. When first applying the present invention, a database with the index to the information and associated query popularity ranking exists. The enhanced popularity score of the present invention can be calculated on the fly in response to each query in Step 20 of FIG. 1, or an entry in a database can be pre-calculated and stored so that the present invention merely accesses the enhanced popularity scores for a given query to create the rankings. The scores of information related to a particular query are compared and the associated information is ranked based on the scores. There can be a blank field in the existing index database for the enhanced popularity score. The present invention could be used to modify the existing popularity score directly. Finally, in the preferred embodiment a separate database may contain the enhanced popularity score. That separate database could contain the enhanced popularity score that is used for ranking, as well as other enhanced popularity scores calculated with different approaches so as to assess the results from different approaches. Once the enhanced popularity score has matured it can replace prior ranking factors in the index database. In another embodiment, there will be a blank field for the enhanced popularity score in the existing index database.

As users begin responding to the search results, the application of the present invention will begin to fill in the enhanced popularity scores in the database.

FIG. 2 shows an embodiment of an index of information for the present invention. This is merely one possible database organization, but this could easily be organized in a different fashion or distributed over different databases, and even locations. In a preferred embodiment Information A, Information B, Information C and Information D are indexed against different queries, Q1-Q4. Two different scoring systems are shown, Original Score (OS) and the scoring of the present invention Enhanced Popularity Score (EPS). Where enough data has been collected to create an EPS for a given piece of information and a given query, the EPS is created and stored in the database. The remaining EPS scores can default to the remainder of the OS. If there are four entries, as shown for Q1 and an EPS has been generated for only Information A and Information B, the remainder will be filed in with the OS in the order the OS would have scored them. For Q1, Information C, $OS_{rem}$ will be 6 since it is the highest score of OS remaining. For Q3, Information C, $OS_{rem}$ will be 4 and $OS_{rem}$ for Information D will be 6, based on the remaining OS of 10 for Information D and 8 for Information C.

In the preferred embodiment, the enhanced popularity score can be tracked along with other ranking factors and can be used as an additional ranking technique. In another embodiment, the enhanced popularity scores of the present invention will not be used for ranking until enough time has passed to ensure a mature ranking, i.e. there is enough historical click information, at least on the more common queries, to ensure accurate enhanced popularity scores. The preferred time is ninety days.

Once the determination is made that the enhanced popularity scores of the present invention are mature, the results may begin to be ranked on the basis of those scores rather than the original popularity scores.

In FIG. 2, where $OS_{rem}$ is used, an alternative approach to the present invention may be used. This approach uses the enhanced popularity score of the same information based on a different query. For instance, For Q1, Information C uses $OS_{rem}$, but if Q1, and Q4 were similar enough, the present invention could use the EPS of Information C of Q4 for the EPS of Information C for Q1.

There are many techniques to relate one query to another so that enhanced popularity scoring can be shared. One technique is reverse relevance. If the query "Tylenol" returned Eckerd's and "acetaminophen" also returned Eckerd's, it may be assumed that the queries are related. Another technique is to strip key terms from the query. If the query "California red wine" were entered, the enhanced popularity scores for "California wine" or "red wine" could be used if the scores for "California red wine" are not available. The present invention could look one step up the open directory structure to find related queries. Any standard technique of relating queries may be used. In FIG. 2, if there is a related query to Q1, then the $OS_{rem}$ used for Information C and Information D could be replaced with the EPS of the related query. This would work the same for on the fly calculations of enhanced popularity rankings.

Once the EPSs are filled in, using whichever technique the designer chooses, the present invention will update the calculations of the EPSs periodically, preferably every twenty-four hours. If an EPS has already been recalculated due to use during the past twenty-four hours, preferably it will not be updated. The updating is used to ensure that the time decay used to create each EPS is as current as possible. This will also ensure that EPSs from queries created on the fly will be as close to those contained in the database of FIG. 2 as possible.

In the preferred embodiment of the present invention, the enhanced popularity scores of the present invention will only be used to rank a preset number of search results, and the original popularity scores alone are used for the remaining results. In the preferred embodiment, the traditional popularity scores are blended with the enhanced popularity scores, with an initial lower weight on the enhanced popularity scores until a maturing time has past. Up to ten of these mixed results are then backfilled with Keyword search. As keyword search results are selected and enhanced popularity results are ignored, new sites climb into the top ten of the popularity. The number of top spots used of course can vary to the preference of the designer and the perceived responsiveness of the system.

The present invention is useful in any information collection search where the results are returned to the user based on relevance. For instance, databases of news archives, or library card catalogues could benefit from the present invention. The approaches of the present invention can be used as selectively as the designer desires.

One potential downside to the present invention is that its reliance on use data, i.e. clicks in the Internet world, make it susceptible to SPAMing with robots or other techniques.

There are a number of techniques that are used as part of the present invention to protect the enhanced popularity scores derived using the present invention. One approach of the present invention is to use a checksum approach. Preferably, when using the present invention for Internet search results, when the user clicks on a result, they are first redirected to a tracking site, then directed on to the target site. The tracking site allows collection of the use data that will be used to create the enhanced popularity scoring of the present invention, this is Step 10 of FIG. 1. When the user is directed to the tracking site, the present invention encryption codes a time and date stamp into the redirect call. The time and date stamp are preferable unique for the query and URL.

The encryption key protected time and date stamp will reduce the impact of robots that copy the redirect link and are programmed to make calls to that link at set intervals. If the redirect call is not received at the redirect site within, preferably, half an hour, the redirect site will redirect the call from the expired redirect call, but will not track it as a use for the enhanced popularity ranking of the present invention. The preferred interval of one half hour is adjustable. The query, URL, and a password are all combined into a binary encryption key, and as such is unique for any query URL.

A different technique of the present invention to protect the enhanced popularity scoring is to watch for an unnatural pattern of hits. This can be done either programmatically, or by an editor. A preferred programmatic solution is to analyze and characterize all aspects of clicks (time, server, user, other session activity) to establish expected behavior and distributions. Behavior and distributions differing significantly from these are identified as being the result of Spam. For example, most users do more than a single search, so there is an expected amount of randomness in behavior. Generally a user would not use two different queries to access the same URL. Thus through Fourier analysis, all user metrics can be examined in the frequency domain to detect periodic, non-random (non white noise) behavior.

While the primary purpose of the present invention is to enhance the relevancy of results returned to users searching vast collections of information, the present invention can be used for other assessments as well. An example use is when a web designer is trying to determine which web site name will have the greatest attraction when returned in web search results. A search engine company could agree to return the web site with different titles at the same placement to the same queries and then create enhanced popularity scores to determine which title works best. For instance, a site entitled "World of Pets" may garner a low enhanced popularity score when placed third on the results listing in response to the query "puppies." However, with the same placement, the title "Dog's Best Friend" returns a much higher enhanced popularity score.

An additional use of the present invention may be to use the enhanced popularity scores to enhance compensation plans with respect to paid placements. For instance, if a site pays to be returned first in response to a query, but over time the enhanced popularity scoring demonstrates that the site should be ranked twentieth, the arrangement with the company paying for placement can either be adjusted to have the placement return based on the scoring, or leave the site in the first response spot, but charge extra for the fact that the search engine is returning a site that is not as relevant or desirable to its users first, thereby reducing the relevancy of its search results.

There will be many uses for the enhanced popularity scoring of the present invention of collections of information continue to grow both online and in discreet databases.

The invention claimed is:

1. A computer implemented method comprising:
creating an enhanced popularity score for a piece of information based on inflation and rank adjustment factors applied to clicks of the piece of information, wherein the inflation factors weigh more recent clicks of the piece of information more heavily than older clicks of the piece of information based on timestamps of the recent and older clicks and the inflation factors contribute a positive value to the enhanced popularity score for each of the clicks, and wherein the rank adjustment factor increases the enhanced popularity score for lower enhanced popularity scores;
ranking the piece of information among other pieces of information based on the enhanced popularity score; and
generating a search report comprising the piece of information using the ranking.

2. A computer implemented method comprising:
receiving a request from a user to search a collection of information;
determining a result of the search consisting of ranking the result based on an enhanced popularity score, wherein the enhanced popularity score for a piece of information weighs more heavily a newer click for the piece of information that an older click for the piece of information based on timestamps of the newer and older clicks, wherein the enhanced popularity score for lower rank pieces of information is increased using rank adjustment factors, and each piece of information contributes a positive value to the enhanced popularity score; and
sending the result to the user.

3. The computer implemented method of claim 2 wherein said enhanced popularity score is created using adaptive inflation scoring.

4. The computer implemented method of claim 2 wherein said enhanced popularity score is created using blended inflation scoring.

5. A computer implemented method comprising:
receiving a request from a user to search a collection of information;
collecting a time history of clicks for a piece of information;
modifying the time history of clicks by applying a time decay rate to each click in said time history of clicks, wherein the time decay rate produces a value greater for a newer click of the piece of information that an older click of the piece of information based on timestamps of the newer and older clicks and each value is a positive value;
generating the enhanced popularity score for the piece of information based on the modified time history of clicks;
determining an expected click rate for said piece of information; adjusting the enhanced popularity score based on assessing actual click rate of said piece of information against the expected click rate;
determining the result of the search consisting of ranking the piece of information based on the enhanced popularity score; and
sending the result to the user.

6. The computer implemented method of claim 5, wherein said time decay rate is modified based on the time history of clicks of the piece of information.

7. The computer implemented method of claim 6, wherein said historical click is stored as a static value, wherein said static value may be adjusted periodically.

8. The computer implemented method of claim 6, wherein said time history of click is reassessed dynamically.

9. The computer implemented method of claim 5, wherein said time decay rate is modified dynamically based on the rate of click of said information.

10. A method comprising:
receiving a request from a user to search a collection of information;
assigning at least a high click time decay rate and a low click time decay rate to a piece of information;
tracking a click history of said piece of information;
generating at least two hypothetical enhanced popularity scores for the piece of information based on said click history and said high and low click time decay rates, wherein the time decay rates produce a value greater for a newer click of said piece of information that an older click of said piece of information based on timestamps of the newer and older clicks and each value is a positive value, wherein the high click time decay rate is for a highly trafficked site associated with said piece of information and the low click time decay rate is for a lower trafficked site associated with said piece of information;
generating an enhanced popularity score for said piece of information by applying a weighting factor to said hypothetical scores;
determining the result of the search consisting of ranking the piece of information based on the enhanced popularity score; and
sending the result to the user.

11. The method of claim 10 wherein said weighting factor is based on the actual rate of click of the piece of information.

12. The method of claim 11 wherein said enhanced popularity score is adjusted based on assessing actual click rate of said piece of information against and expected click rate.

13. The method of claim 11 wherein said piece of information is a website and said rate of click is the traffic to said website.

14. The method of claim 13 wherein said traffic to said website is an estimated value.

15. A method consisting of:
receiving a request from a user to search a collection of information;
placing a Lime and date code for a piece of information in a call to a tracking website, the time and date code used track the time difference between when the user requested the piece of information and when the user was redirected to that piece of information;
reviewing the time and date code at the tracking website to determine whether to account for the website call in an enhanced popularity score, wherein the enhanced popularity score weighs more heavily a newer click of a piece of information that an older click of the piece of information based on timestamps of the newer and older clicks and each piece of information contributes a positive value to the enhanced popularity score;
determining the result of the search based on the enhanced popularity score; and
sending the result to the user.

16. The method of claim 15 wherein said step of determining whether to account for the website call comprises determining the time elapsed from the time said time and date code was generated.

* * * * *